May 27, 1958  E. S. GILLILAN  2,835,999

REVOLVING FISH LURE

Filed Aug. 23, 1957

INVENTOR.
EARL S. GILLILAN,
BY
McMorrow, Berman & Davidson
ATTORNEYS.

United States Patent Office 2,835,999
Patented May 27, 1958

2,835,999

REVOLVING FISH LURE

Earl S. Gillilan, Needles, Calif.

Application August 23, 1957, Serial No. 679,903

2 Claims. (Cl. 43—26.2)

This invention relates to fish lures, and more particularly has reference to a fish lure including a pair of body sections spaced longitudinally of and freely rotatable upon a shaft, said sections including means causing the same to rotate in opposite directions when the lure is drawn through the water. On the rear end of the shaft, a flexible tail is affixed, having a laterally projecting finger engaged, on each rotation of the trailing body section through 360 degrees, by a rearwardly projecting finger or pin carried by the trailing section, thus to effect a vibratory motion of the tail. Carried by the sections are single or treble hooks, and on the leading end of the shaft there is provided a swiveled connection for attachment of the lure to a fishing line or leader.

The main object of the present invention is to provide a fishing lure that will be particularly attractive to fish, by reason of a highly life-like action of the lure simulating with a high degree of faithfulness the movements of a minnow or other bait fish.

Another object is to add to the faithfulness of the simulation through the provision of the flexible tail and the means for imparting periodic fluttering or vibratory movements to the tail, such as those of a live fish while it is stabilizing and steering itself within the water.

Another object is to form the fishing lure in a manner such that the relative rotation of the leading and trailing sections in opposite directions will be facilitated by fins that not only simulate the fins of a live bait fish, but also are spirally arranged upon their associated body sections, to produce the rotation of the sections in opposite directions.

Another object is to provide the hooks directly upon the rotating sections so that said hooks will turn rapidly through arcs about the axis of rotation of the sections, thus to conceal the nature of the hooks and locate the same where they will in every instance be in position to hook a game fish striking at or closely approaching the fishing lure.

Other objects will appear from the following description, the claims appended thereto, and from the annexed drawing, in which like reference characters designate like parts throughout the several views, and wherein:

Figure 1:
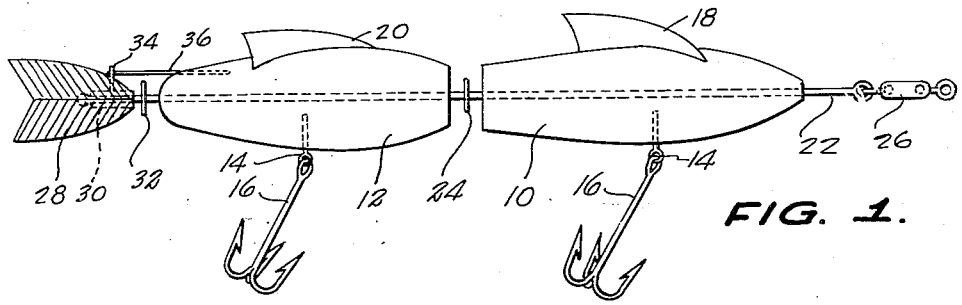
Figure 1 is a side elevational view of a fish lure according to the present invention.

Referring to the drawings in detail, at 10, 12, there have been designated leading and trailing body sections. Each of these is of generally elliptical formation, with the rear end of the lead section and the front end of the trailing section being spaced apart and being cut off squarely in planes perpendicular to the axis of rotation of the sections. The sections can be ornamentally finished in any desired manner, and can be colored as desired, for the purpose of increasing the attractiveness of the lure and adding to the faithfulness of its simulation to a live bait fish.

Embedded in the respective sections, intermediate opposite edges thereof, are the shanks of eyes 14, and loosely connected to the eyes are hooks 16, which may be either of the single or multiple type, whichever is desired. The hooks, thus, will rotate with the sections 10, 12, when the lure is drawn through the water.

Figure 2:
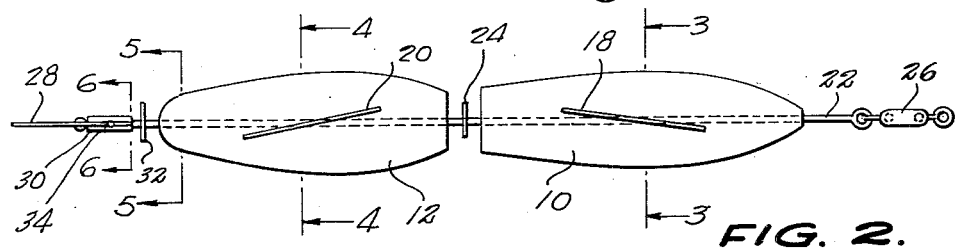
Figure 2 is a top plan view of Figure 1, the wire finger being omitted.
Figures 3, 4, 5:
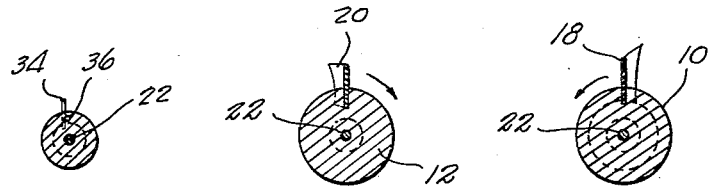
Figure 3 is a transverse section on line 3—3 of Figure 2, through the leading body section.
Figure 4 is a transverse section on line 4—4 through the trailing section.
Figure 5 is a transverse sectional view on line 5—5 through the trailing body section.
Figure 6:
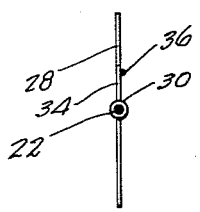
Figure 6 is an enlarged sectional view on line 6—6 of Figure 2, showing the tail construction.

The sections can be of any desired material, such as plastic or the like, and embedded in the sections are elongated fins 18, 20, progressively increased in height in the direction of their trailing ends. The fins are extended spirally of the sections, that is, they are obliquely disposed relative to the longitudinal center lines of the sections as best shown in Figure 2. Fin 18 is inclined obliquely oppositely to the fin 20, the purpose of this being to cause the section 10 to rotate in one direction, simultaneously with rotation of the section 12 in an opposite direction, as shown in Figures 3 and 4.

The sections are formed with axial bores, loosely receiving a shaft 22 which may be of thin wire, rod material, or the like, and fixed to the shaft between the sections is a spacer disc 24.

At the leading end of the shaft 22, there is attached a line-connecting swivel 26 of conventional design.

A tail 28, formed in a configuration simulating the tail of a live bait fish, is of flexible material, such as plastic, and is fixedly secured to the shaft 22 by formation of a sleeve 30 integral with the tail, which sleeve receives and is fixedly secured to the trailing end of the shaft 22. Any suitable means of fixedly securing the tail to the shaft can of course be employed.

Fixed to the shaft 22, between the section 12 and the tail 28, is a metal disc 32 limiting rearward movement of the section 12 upon the shaft.

Embedded in or otherwise fixedly connected to the tail 28 is a small pin 34 extending radially of the shaft 22 and projecting a short distance beyond one longitudinal edge of the tail. An elongated spring wire finger 36 is extended parallel to the shaft 22, and is spaced laterally from the shaft, with its leading end embedded in the material of the section 12 and its trailing end extending slightly beyond the pin 34, at a location such that the pin 34 will be disposed in the path of rotation of the finger 36 about the axis defined by the shaft 22.

By reason of the construction illustrated and described, it will be apparent that when the lure is drawn through the water, the sections 10, 12 will be simultaneously rotated in opposite directions, imparting to the lure a life-like simulation of the swiveling motion of a live minnow or other bait fish. As a result, the finger 36 will travel in a circular path about the axis of rotation, and on each rotation of the section 12 through 360 degrees, the free end of the highly flexible spring finger will lightly tick the pin 34 as it passes the pin, causing a vibration or fluttering of the tail 28. This single fluttering motion of the tail on each turn of the section 12 through 360 degrees will cause the lure to dart from right to left in a simulated swimming motion, further adding to the lifelike action that is a characteristic of the lure.

It will be understood that the lure can be made in any of various sizes, and it is proposed that it might be made in sizes from one inch long, for trout, crappie, and similar fish, up to ten inches long for salmon, muskellunge, striped bass, etc. Further, the lure can be used either for trolling or casting, and can be, as previously mentioned, painted or otherwise ornamentally finished.

The attachment of the hooks to the rotating portions of the lure causes the hooks to turn about the axis in circular paths, so that they will tend to traverse areas where they will be more likely to hook a game fish, whether the game fish has made a full strike at the lure or, alternatively, has approached the lure closely preliminary to making a strike. Further, the rotary movement of the hooks tends to conceal their true nature from the game fish.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A fish lure comprising a shaft connectable at one end to a line; leading and trailing body sections freely rotating on said shaft; means on the respective sections for causing the same to rotate in opposite directions on movement of the lure through the water; hooks carried by said sections; a flexible tail secured to the trailing end of the shaft; and means on the trailing section for imparting a vibratory motion to the tail on each rotation of the trailing section through 360 degrees, comprising a flexible, spring wire finger fixedly anchored at one end to the trailing section and extending substantially parallel to the axis of rotation of the trailing section, thus to rotate with the trailing section about said axis, the tail including a laterally projecting pin disposed to be struck by the finger on each full rotation of the trailing section to impart said fluttering motion to the tail.

2. A fish lure comprising an elongated shaft; means at one end of the shaft for connecting the same to a fishing line; a pair of elongated, tapering body sections axially bored to receive the shaft and freely revolving on the shaft; hooks depending from said sections and connected to the sections for rotation therewith; fins secured to the respective sections, said fins being oppositely angled in respect to the longitudinal medians of the sections, so as to effect rotation of the sections in opposite directions on movement of the lure through the water; an elongated spring wire finger secured to and projecting rearwardly from the trailing section in spaced relation to the shaft for rotation with the trailing section about the shaft; a flexible tail fixedly secured to the shaft; and a projection on the tail extending radially of the shaft in the path of rotatable movement of said finger, so as to be struck by the finger on each 360 degree rotation of the trailing section, thereby to impart a fluttering motion to the tail during movement of the lure through the water.

References Cited in the file of this patent

UNITED STATES PATENTS

| 831,831 | Clippinger | Sept. 25, 1906 |
| 2,569,057 | Hinerman | Sept. 25, 1951 |
| 2,691,235 | Pcola | Oct. 12, 1954 |

FOREIGN PATENTS

| 579 | Great Britain | Apr. 1, 1909 |